(12) United States Patent
Miyamoto

(10) Patent No.: US 6,181,675 B1
(45) Date of Patent: Jan. 30, 2001

(54) UNINTERRUPTED SWITCHING BETWEEN ACTIVE AND BACKUP SYSTEMS IN ATM COMMUNICATION APPARATUS

(75) Inventor: Akihiro Miyamoto, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/110,200

(22) Filed: Jul. 6, 1998

(30) Foreign Application Priority Data

Jul. 8, 1997 (JP) .................................................. 9-182326

(51) Int. Cl.$^7$ ...................................................... H04L 12/56
(52) U.S. Cl. .......................... 370/218; 370/231; 370/235; 370/395; 370/465; 370/506
(58) Field of Search .................... 370/216, 217, 370/218, 229, 230, 231, 232, 235, 236, 389, 395, 465, 466, 467, 470, 471, 474, 503, 505, 506

(56) References Cited

U.S. PATENT DOCUMENTS

| 5,222,108 | * | 6/1993 | Suzuki | 375/118 |
| 5,636,215 | * | 6/1997 | Kubo et al. | 370/397 |
| 5,715,249 | * | 2/1998 | Miyamoto | 370/395 |
| 5,799,003 | * | 8/1998 | Fujimaki et al. | 370/244 |
| 6,023,467 | * | 2/2000 | Abdelhamid et al. | 370/395 |
| 6,097,739 | * | 8/2000 | Yamashita | 370/528 |

FOREIGN PATENT DOCUMENTS

| 4-86043 | 3/1992 | (JP) . |
| 4-98917 | 3/1992 | (JP) . |
| 4-98941 | 3/1992 | (JP) . |
| 4-98944 | 3/1992 | (JP) . |
| 6-311176 | 11/1994 | (JP) . |
| 7-74755 | 3/1995 | (JP) . |
| 7-74756 | 3/1995 | (JP) . |
| 8-107416 | 4/1996 | (JP) . |
| 8-256159 | 10/1996 | (JP) . |
| 9-247162 | 9/1997 | (JP) . |

* cited by examiner

Primary Examiner—Alpus H. Hsu
(74) Attorney, Agent, or Firm—Young & Thompson

(57) ABSTRACT

A reception device in the ATM communication apparatus has a format conversion buffer, an underflow detecting circuit, and an in-device empty cell insertion control circuit in each of the active and backup systems. The format conversion buffer effects a format conversion on a transmission path from a format in which an ATM cell is inserted in only the payload of an SDH frame to a format in which an ATM cell is inserted in both the overhead and payload of an SDH frame, thereby to absorb the difference between transmission path lengths of the active and backup systems. The underflow detecting circuit detects an underflow of the format conversion buffer and outputs a detected underflow signal. The in-device empty cell insertion control circuit outputs an in-device empty cell insertion instruction signal in response to a detected underflow signal from the underflow detecting circuit in one of the active and backup systems. An in-device empty cell insertion circuit inserts an in-device empty cell into an output signal from the format conversion buffer in response to an in-device empty cell insertion instruction signal. For switching between the active and backup systems, an in-device empty cell is inserted to prevent cells from being shifted out of phase between the active and backup systems.

2 Claims, 4 Drawing Sheets

UNINTERRUPTED SWITCHING BETWEEN ACTIVE AND BACKUP SYSTEMS IN ATM COMMUNICATION APPARATUS

BACKGROUND OF THE INVENTION

1. Field of the Invention

The present invention relates to an ATM (Asynchronous Transfer Mode) communication apparatus, and more particularly to a device for effecting uninterrupted switching between active and backup systems on a reception side of an ATM communication apparatus.

2. Description of the Related Art

For uninterrupted switching on a transmission path between active and backup systems (also referred to as "system 0" and "system 1") of an ATM communication apparatus, ATM cells of input data from the transmission path are kept in phase with each other at all times between the active and backup systems on a reception side of the ATM communication apparatus. For performing such a function, it is necessary to hold ATM cells to be transmitted in the same sequence between the system 0 and the system 1 on a transmission side of the ATM communication apparatus.

To meet such a requirement, heretofore, the transmission side of the ATM communication apparatus has a circuit for sending a reset signal from the active system to the backup system when a format conversion buffer underflows to simultaneously initializing buffer operation, a circuit for indicating the leading position of an ATM cell with respect to the overhead of an SDH (Synchronous Digital Hierarchy) frame from the active system to the backup system for each frame, and holding ATM cells in phase with each other, and a circuit for indicating the phase of an OAM (Operation And Maintenance) cell from the active system to the backup system and vice versa, and inserting a transmission path empty cell into one of the active and backup systems when an OAM cell is present in only the other system.

FIG. 1 of the accompanying drawings shows a reception device in a conventional ATM communication apparatus.

As shown in FIG. 1, the reception device comprises a system 0, a system 1, and switching circuits 9, 18.

The system 0 comprises a write control circuit 2, a read control circuit 3, a buffer underflow detecting circuit 4, a format conversion buffer 5, an in-device empty cell insertion circuit 7, and an in-device empty cell insertion control circuit 8.

The system 1 similarly comprises a write control circuit 11, a read control circuit 12, a buffer underflow detecting circuit 13, a format conversion buffer 14, an in-device empty cell insertion circuit 16, and an in-device empty cell insertion control circuit 17.

The format conversion buffers 5, 14 effect a format conversion on the transmission path from a format in which an ATM cell is inserted in only the payload of an SDH frame to a format in which an ATM cell is inserted in both the overhead and payload of an SDH frame, thereby to absorb the difference between transmission path lengths of the systems 0, 1.

The write control circuits 2, 11 control the writing of cells S2, S13 on the transmission path into the format conversion buffers 5, 14, respectively.

The read control circuits 3, 12 control the reading of the format conversion buffers 5, 14, respectively.

The buffer underflow detecting circuits 4, 13 monitor the amount of buffering of the format conversion buffers 5, 14, respectively, with control signals S4, S5 from the write and read control circuits 2, 3 and control signals S15, S16 from the write and read control circuits 11, 12. When an underflow is detected, the buffer underflow detecting circuits 4, 13 transmit detected underflow signals S6, S17 to the in-device empty cell insertion control circuits 8, 17 in the respective systems.

When the in-device empty cell insertion control circuit 8 receives the detected underflow signal S6, the in-device empty cell insertion control circuit 8 outputs an in-device empty cell insertion instruction signal S9 to the read control circuit 3 and the in-device empty cell insertion circuit 7.

When the in-device empty cell insertion control circuit 17 receives the detected underflow signal S17, the in-device empty cell insertion control circuit 17 outputs an in-device empty cell insertion instruction signal S20 to the read control circuit 12 and the in-device empty cell insertion circuit 16.

When the read control circuits 3, 12 receive the in-device empty cell insertion instruction signals S9, S20, respectively, the read control circuits 3, 12 do not read effective cells from the format conversion buffers 5, 14, respectively.

FIG. 2 of the accompanying drawings shows a transmission device in a conventional ATM communication apparatus, and FIG. 3 of the accompanying drawings shows a construction of a SDH frame.

The system 0 comprises a format conversion buffer 21A, a cell pulse generator 22A, a cell position byte number measuring circuit 23A, and a cell pulse generation controller 24A. The system 1 similarly comprises a format conversion buffer 21B, a cell pulse generator 22B, a cell position byte number measuring circuit 23B, and a cell pulse generation controller 24B.

These circuits are employed for the purpose of completely synchronizing the operation of circuits around format conversion buffers between the system 0 and the system 1 on the transmission side to insert transmission path empty cells into effective cells at the same position.

The cell position byte number measuring circuit 23A measures from a SPOH (overhead) signal and a cell pulse how many bytes (values a, b in FIG. 3) an ATM cell is spaced apart from positions corresponding to SOH, POH in an SDH frame, and transmits the measured number of cell position bytes to the cell pulse generation controller 24B in the system 0. The cell pulse generation controller 24B calculates the next number (value b) of cell position bytes from the number (value a) of cell position bytes measured by the cell position byte number measuring circuit 23A and the SPOH indicating signal, and controls the cell pulse generator 22B so that it generates a cell pulse at a position indicated by the value b. On the other hand, the cell pulse generation controller 24A determines a cell pulse position, independent of the system 0.

Therefore, the number of cell position bytes in the system 0 is equalized with the number of cell position bytes in the system 0. In this manner, the operation to insert transmission path empty cells is completely synchronized between the systems, thus holding ATM cells to be transmitted in the same sequence.

The in-device empty cell insertion circuits 7, 16 insert in-device empty cells into output signals S7, S18 from the format conversion buffers 5, 14 in response to the in-device empty cell insertion instruction signals S9, S20, respectively.

In the above system for effecting uninterrupted switching on the transmission path between the system 0 and the system 1 of an ATM communication apparatus, the reception side of the ATM communication apparatus is required to monitor the phase of ATM cells in the system 0 and the system 1 of input data from the transmission path, count phase differences of the ATM cells, and equalize the phase differences of the ATM cells with the format conversion buffers for absorbing the difference between the transmission path lengths of the systems 0, 1 for thereby keeping the ATM cells in the systems 0, 1 in phase with each other at all times. If the detection of underflows in the format conversion buffers differs between the systems 0, 1, then an in-device empty cell is inserted into only one of the systems 0, 1, causing a cell phase shift which makes it impossible to effect uninterrupted switching on the transmission path between the system 0 and the system 1.

A signal on the transmission path may be an OAM cell in only one of the systems 0, 1. When an OAM cell is received by only one of the systems 0, 1, a cell phase shift is caused, also making it impossible to effect uninterrupted switching on the transmission path between the system 0 and the system 1.

For achieving uninterrupted switching on the transmission path between the system 0 and the system 1 on the reception side of the ATM communication apparatus, it is necessary to hold ATM cells to be transmitted in the same sequence between the system 0 and the system 1 on the transmission side of the ATM communication apparatus. To meet such a requirement, heretofore, the transmission side of the ATM communication apparatus needs to have a circuit for sending a reset signal from the active system to the backup system when a format conversion buffer underflows to simultaneously initializing buffer operation, a circuit for indicating the leading position of an ATM cell with respect to the overhead of an SDH frame from the active system to the backup system for each frame, and holding ATM cells in phase with each other, and a circuit for indicating the phase of an OAM cell from the active system to the backup system and vice versa, and inserting a transmission path empty cell into one of the active and backup systems when an OAM cell is present in only the other system. Therefore, the ATM communication apparatus is relatively large in circuit scale.

SUMMARY OF THE INVENTION

It is therefore an object of the present invention to provide a reception device in an ATM communication apparatus for avoiding a cell phase shift caused when the detection of underflows in format conversion buffers differs between systems 0, 1, and also when an OAM cell is received by only one of the systems 0, 1, for thereby achieving uninterrupted switching on the transmission path between the system 0 and the system 1.

Another object of the present invention is to provide a reception device in an ATM communication apparatus, which has reduced a circuit scale for various circuits around format conversion buffers on a transmission side of the ATM communication apparatus.

According to an aspect of the present invention, a reception device in an ATM communication apparatus monitors the phase of ATM cells in active and backup systems with respect to input data from a transmission path, counts the number of cell phase differences between the active and backup systems, and brings the ATM cells into phase with each other for uninterrupted switching between the active and backup systems. The reception device has a format conversion buffer, an underflow detecting circuit, an in-device empty cell insertion control circuit, an in-device empty cell insertion circuit, and a switching circuit in each of the active and backup systems.

The format conversion buffer effects a format conversion on a transmission path from a format in which an ATM cell is inserted in only the payload of an SDH frame to a format in which an ATM cell is inserted in both the overhead and payload of an SDH frame, thereby to absorb the difference between transmission path lengths of the active system and the backup system. The underflow detecting circuit detects an underflow of the format conversion buffer and outputting a detected underflow signal.

The in-device empty cell insertion control circuit outputs an in-device empty cell insertion instruction signal in response to a detected underflow signal from the underflow detecting circuit in its own system which is one of the active system and the backup system or a detected underflow signal from the underflow detecting circuit in the other system. The in-device empty cell insertion circuit inserts an in-device empty cell into an output signal from the format conversion buffer based on an in-device empty cell insertion instruction signal from the in-device empty cell insertion control circuit in its own system. The switching circuit switches between the active and backup systems.

An in-device empty cell insertion instruction signal is transmitted from the active system to the backup system or from the backup system to the active system for inserting an in-device empty cell to insert an in-device empty cell for switching between the active and backup systems while preventing cells from being shifted out of phase with each other after they have been brought into phase with each other between the active and backup systems.

According to another aspect of the present invention, a reception device in an ATM communication apparatus has a format conversion buffer, an underflow detecting circuit, an in-device empty cell insertion control circuit, an in-device empty cell insertion circuit, a switching circuit, a transmission path empty cell determining circuit, and an OAM cell determining circuit in each of the active and backup systems.

The transmission path empty cell determining circuit determines whether there is a transmission path empty cell or not on a write side of the format conversion buffer, and discards cells without writing the cells when a transmission path empty cell is detected. The OAM cell determining circuit determines whether there is an OAM cell or not on a read side of the format conversion buffer, and outputs a detected OAM cell signal when an OAM cell is detected.

A detected OAM signal is transmitted from the active system to the backup system or from the backup system to the active system, and when an OAM cell is present in only one of the active and backup systems, an in-device empty cell is inserted into the other system for switching between the active and backup systems while preventing cells from being shifted out of phase with each other after they have been brought into phase with each other between the active and backup systems.

It is possible to reduce the circuit scale of various circuits around the format conversion buffer which have heretofore been required on a transmission side of the ATM communication apparatus for holding ATM cells to be transmitted in the same sequence in the active and backup systems.

When a transmission path empty cell is detected, cells are discarded, and a detected OAM signal is transmitted from the active system to the backup system or from the backup system to the active system, and when an OAM cell is present in only one of the active and backup systems, an in-device empty cell is inserted into the other system for holding ATM cells to be transmitted in the same sequence in the active and backup systems on the transmission side of the ATM communication apparatus.

On a reception side of the ATM communication apparatus, when an underflow is detected in a format conversion buffer, an in-device empty cell is inserted on a read side of the format conversion buffer. If an in-device empty cell is inserted into only its own system, then a cell phase shift occurs between the active and backup systems. To avoid this, a detected underflow signal is also transmitted to the in-device empty cell insertion control circuit of the other system, so that in-device empty cells are inserted simultaneously into both the systems for achieving uninterrupted switching between the active and backup systems while preventing cells from being shifted out of phase with each other between the active and backup systems. The in-device empty cell insertion control circuit inserts an in-device empty cell into a corresponding position even when a detected OAM signal is received from the other system, so that when an OAM cell is received in only one of the systems, cells are prevented from being shifted out of phase with each other between the active and backup systems, and uninterrupted switching is achieved between the active and backup systems. It is also determined whether there is a transmission path empty cell or not, and when an OAM cell is detected, information representing a detected OAM cell is transmitted to the in-device empty cell insertion control circuit in the other system.

The above and other objects, features and advantages of the present invention will become apparent from the following description with reference to the accompanying drawings which illustrate an example of the present invention.

DESCRIPTION OF THE PREFERRED EMBODIMENT

Figure 4:
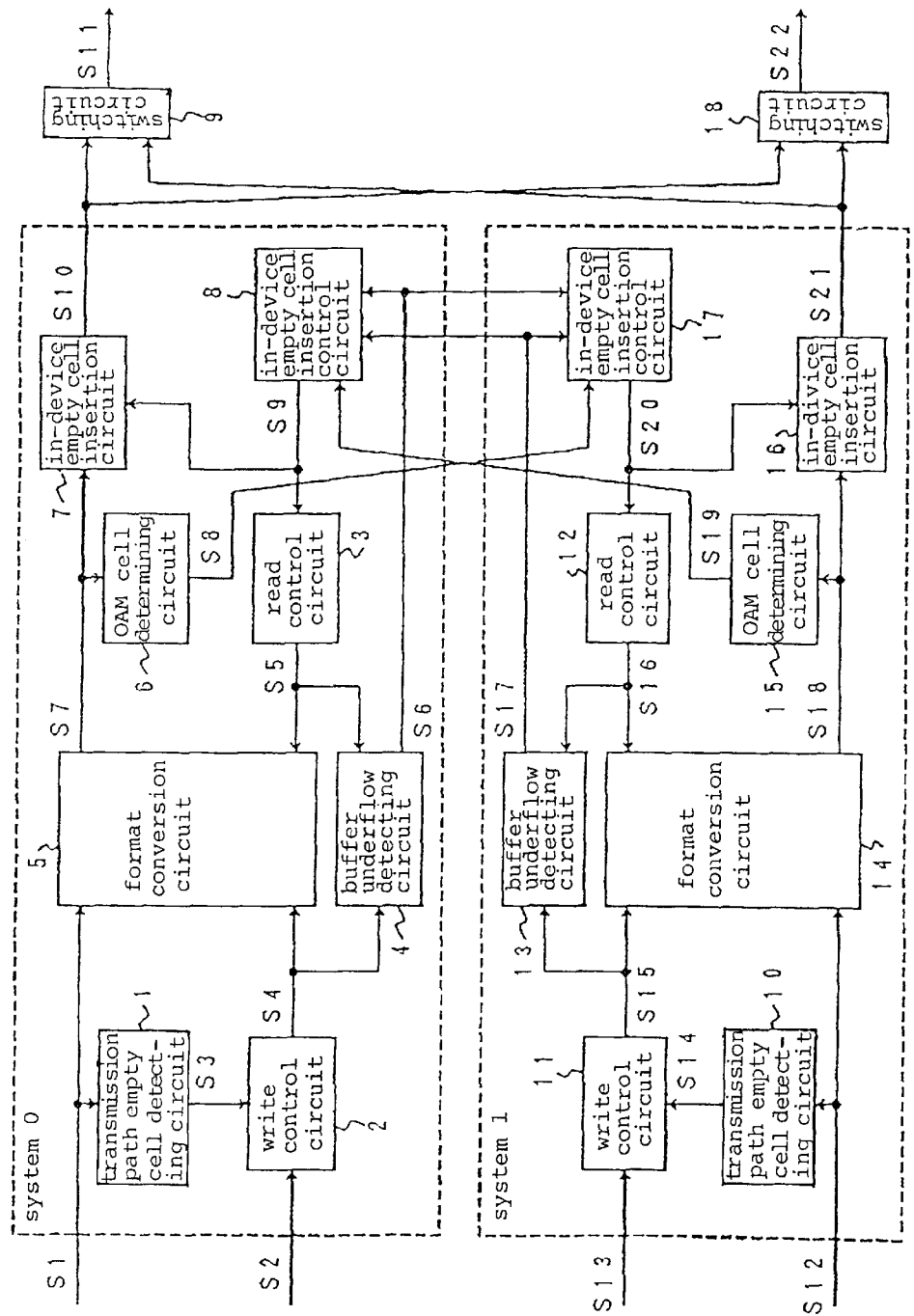
FIG. 4 is a block diagram of a reception device in an ATM communication apparatus according to the present invention.

As shown in FIG. 4, a reception device in an ATM communication apparatus according to the present invention comprises a system 0, a system 1, and switching circuits 9, 18.

The system 0 comprises a transmission path empty cell determining circuit 1, a write control circuit 2, a read control circuit 3, a buffer underflow detecting circuit 4, a format conversion buffer 5, an OAM cell determining circuit 6, an in-device empty cell insertion circuit 7, and an in-device empty cell insertion control circuit 8.

The system 1 similarly comprises a transmission path empty cell determining circuit 10, a write control circuit 11, a read control circuit 12, a buffer underflow detecting circuit 13, a format conversion buffer 14, an OAM cell determining circuit 15, an in-device empty cell insertion circuit 16, and an in-device empty cell insertion control circuit 17.

The format conversion buffers 5, 14 effect a format conversion on the transmission path from a format in which an ATM cell is inserted in only the payload of an SDH frame to a format in which an ATM cell is inserted in both the overhead and payload of an SDH frame, thereby to absorb the difference between transmission path lengths of the systems 0, 1.

The buffer underflow detecting circuits 4, 13 monitor the amount of buffering of the format conversion buffers 5, 14, respectively, with control signals S4, S5 from the write and read control circuits 2, 3 and control signals S15, S16 from the write and read control circuits 11, 12. When an underflow is detected, the buffer underflow detecting circuits 4, 13 transmit detected underflow signals S6, S15 to the in-device empty cell insertion control circuits 8, 17 in the respective systems.

The transmission path empty cell determining circuits 1, 10 determine whether there is an empty cell on the transmission path or not at a write side of the format conversion buffers 5, 14. If the transmission path empty cell determining circuits 1, 10 detect an empty cell on the transmission path, then the transmission path empty cell determining circuits 1, 10 output detected transmission path empty cell signals S3, S14.

The write control circuits 2, 11 control the writing of cells S2, S13 on the transmission path into the format conversion buffers 5, 14, respectively. However, the write control circuits 2, 11 do not write cells S2, S13 if the transmission path empty cell determining circuits 1, 10 output detected transmission path empty cell signals S3, S14.

The OAM cell determining circuits 6, 15 determine whether there is an OAM cell or not at a read side of the format conversion buffers 5, 14, based on output signals S7, S18 from the format conversion buffers 5, 14. When an OAM cell is detected, the OAM cell determining circuits 6, 15 transmit detected OAM cell signals S8, S19 to the in-device empty cell insertion control circuits 17, 8, respectively, in the other systems.

When the in-device empty cell insertion control circuit 8 receives either one of the detected underflow signal S6 from its own system, the detected underflow signal S17 from the other system, and the detected OAM cell signal S19 from the other system, the in-device empty cell insertion control circuit 8 outputs an in-device empty cell insertion instruction signal S9 to the read control circuit 3 and the in-device empty cell insertion circuit 7.

When the in-device empty cell insertion control circuit 17 receives either one of the detected underflow signal S17 from its own system, the detected underflow signal S6 from the other system, and the detected OAM cell signal S8 from the other system, the in-device empty cell insertion control circuit 17 outputs an in-device empty cell insertion instruction signal S20 to the read control circuit 12 and the in-device empty cell insertion circuit 16.

The read control circuits 3, 12 control the reading of the format conversion buffers 5, 14, respectively. When the read control circuits 3, 12 receive the in-device empty cell insertion instruction signals S9, S20, respectively, the read control circuits 3, 12 do not read effective cells from the format conversion buffers 5, 14, respectively.

The in-device empty cell insertion circuits 7, 16 insert in-device empty cells into output signals S7, S18 from the format conversion buffers 5, 14 in response to the in-device empty cell insertion instruction signals S9, S20, respectively.

The switching circuits 9, 18 switch between output signals S10, S12 from the systems 0, 1 to effect switching between the active and backup systems.

Operation of the reception device in the ATM communication apparatus according to the present invention will be described below.

Figure 2:
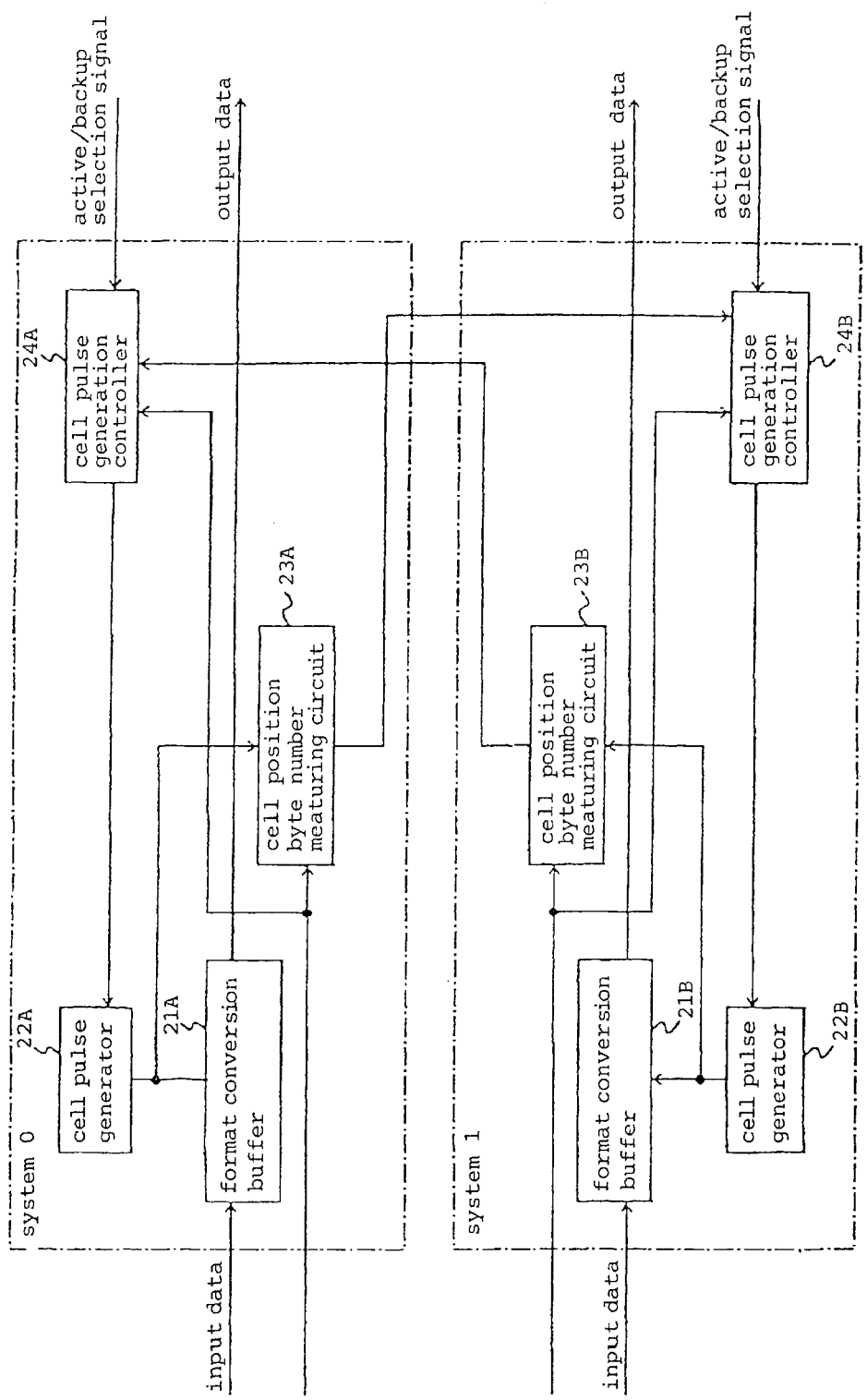
FIG. 2 is a block diagram of a transmission device in a conventional ATM communication apparatus.
Figure 3:
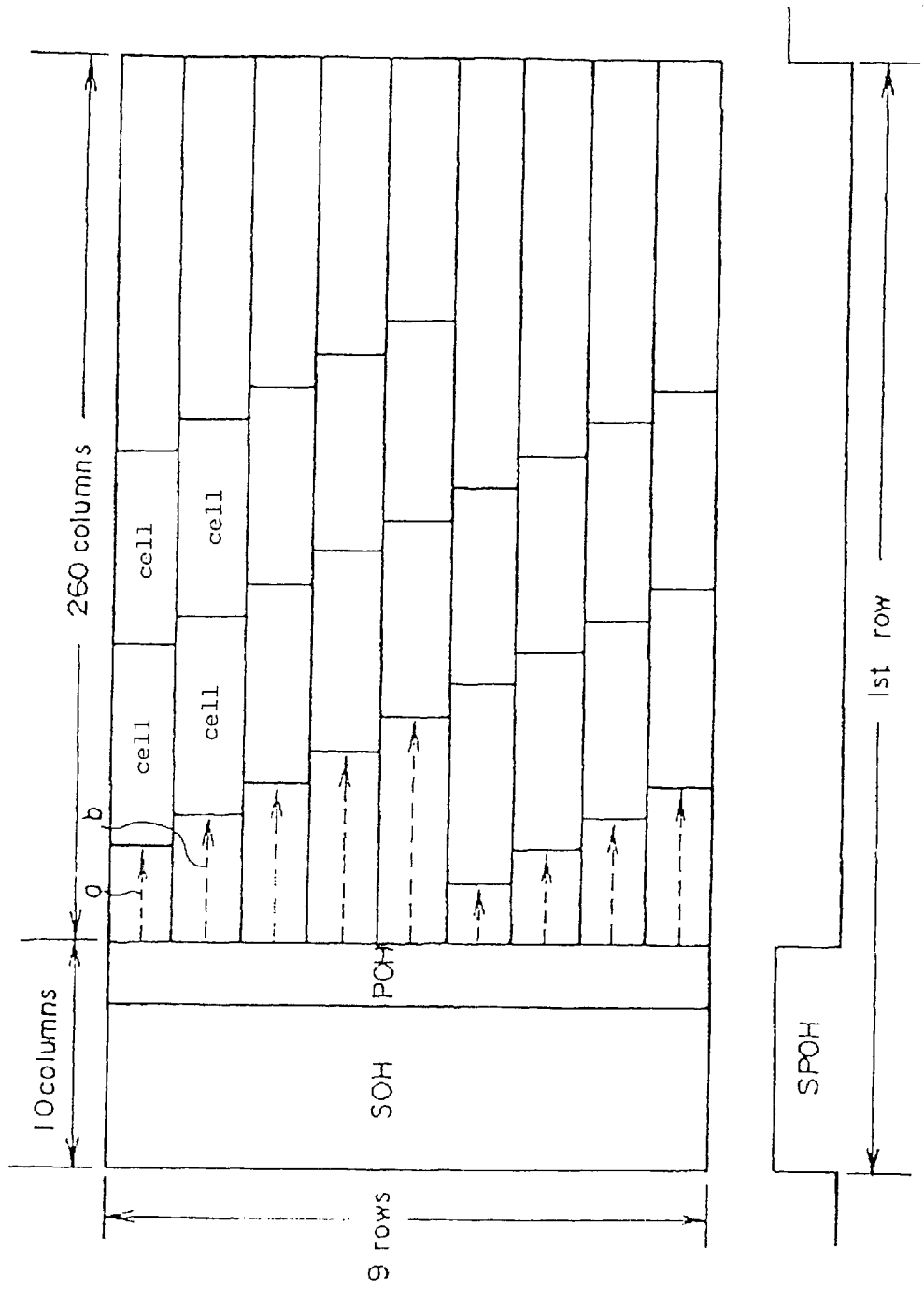
FIG. 3 is a view showing the construction of a SDH frame.

The ATM communication apparatus shown in FIG. 2 is based on the assumption that cells have already been in phase with each other between the systems 0, 1 and switching between the systems 0, 1 is uninterrupted whenever such switching may be carried out.

The transmission path empty cell determining circuits 1, 10 determine whether there is an empty cell or not in input data S1, S12. If an empty cell is detected, then the transmission path empty cell determining circuits 1, 10 output detected transmission path empty cell signals S3, S14 to the write control circuits 2, 11. In response to the detected transmission path empty cell signals S3, S14, the write control circuits 2, 11 discard cells S2, S12 without writing them into the format conversion buffers 5, 14. As a result, if ATM cells to be transmitted are not in the same sequence between the system 0 and the system 1 on the transmission side of the ATM communication apparatus, then an empty cell is prevented from existing in received data in only one of the systems 0, 1, thus preventing ATM cells in the systems 0, 1 from being shifted in phase for thereby ensuring uninterrupted switching.

On the read side of the ATM communication apparatus, the OAM cell determining circuits 6, 15 determine whether there is an OAM cell or not. If an OAM cell is detected, then the OAM cell determining circuits 6, 15 transmit detected OAM cell signals S8, S19 to the in-device empty cell insertion control circuits 17, 8, respectively, in the other systems. In response to the detected OAM cell signals S19, S8, the in-device empty cell insertion control circuits 8, 17 issue in-device empty cell insertion instruction signals S9, S20 to the in-device empty cell insertion circuits 7, 16, respectively, which insert an in-device empty cell into output data S7, S18 from the respective format conversion buffers 5, 14. As a consequence, an empty cell is prevented from existing in received data in only one of the systems 0, 1, thereby preventing ATM cells in the systems 0, 1 from being shifted in phase, so that uninterrupted switching will be ensured.

The above process of determining whether there is a transmission path empty cell or not and also the above process of determining whether there is an OAM cell or not are based on the assumption that ATM cells to be transmitted are not in the same sequence between the system 0 and the system 1 on the transmission side of the ATM communication apparatus. If ATM cells to be transmitted are in the same sequence between the system 0 and the system 1 on the transmission side of the ATM communication apparatus, then the above process of determining whether there is an empty cell or not on the transmission path and also the above process of determining whether there is an OAM cell or not are not required.

According to the present invention, the process of determining whether there is a transmission path empty cell or not and the process of determining whether there is an OAM cell or not are effected on the reception side of the ATM communication apparatus. Therefore, circuits for holding ATM cells to be transmitted in the same sequence between the systems on the transmission side are omitted, so that the overall circuit scale can be reduced.

Figure 1:
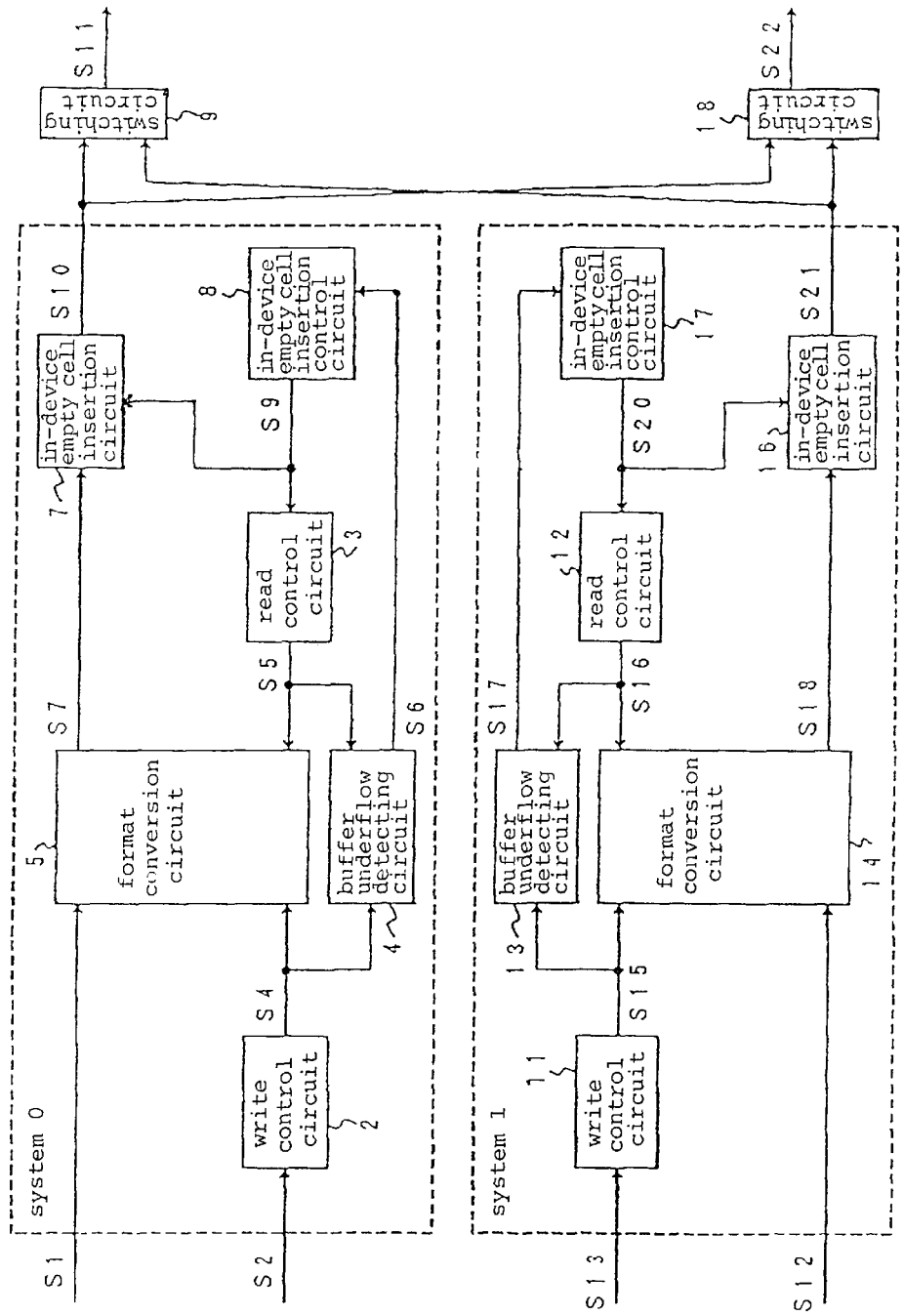
FIG. 1 is a block diagram of a reception device in a conventional ATM communication apparatus.

According to the present invention, furthermore, an underflow of the format conversion buffers is monitored by control signals issued from the write and read control circuits. Since data of SOH and POH of an SDH frame are not written in the format conversion on the reception side, the format conversion buffers are basically subject to an underflow. When an underflow is detected, a buffer underflow detecting circuit transmits a detected underflow signal to the in-device empty cell insertion control circuit to stop reading an effective cell and insert an in-device empty cell into its own system, and also transmits a detected underflow signal to the in-device empty cell insertion control circuit of the other system to insert a in-device empty cell into the other system. If a detected underflow signal is not transmitted to the other system as with the conventional apparatus shown in FIG. 1, then an in-device empty cell is inserted into only one of the systems, bringing ATM cells, which have once been held in phase, out of phase with each other between the systems 0, 1 thereby to prevent uninterrupted switching. The buffer underflow detecting circuits are to be employed irrespective of whether ATM cells on the transmission side are in the same sequence or not between the systems 0, 1, for achieving uninterrupted switching between the systems 0, 1.

While a preferred embodiment of the present invention has been described using specific terms, such description is for illustrative purposes only, and it is to be understood that changes and variations may be made without departing from the spirit or scope of the following claims.

What is claimed is:

1. A reception device in an ATM communication apparatus including an active system and a backup system, for switching between the active system and the backup system, each of said active system and said backup system comprising:

a format conversion buffer for effecting a format conversion on a transmission path from a format in which an ATM cell is inserted in only the payload of an SDH frame to a format in which an ATM cell is inserted in both the overhead and payload of an SDH frame, thereby to absorb the difference between transmission path lengths of said active system and said backup system;

an underflow detecting circuit for detecting an underflow of said format conversion buffer and outputting a detected underflow signal;

an in-device empty cell insertion control circuit for outputting an in-device empty cell insertion instruction signal in response to a detected underflow signal from said underflow detecting circuit in its own system which is one of said active system and said backup system or a detected underflow signal from said underflow detecting circuit in the other system; and an in-device empty cell insertion circuit for inserting an in-device empty cell into an output signal from said format conversion buffer based on an in-device empty cell insertion instruction signal from said in-device empty cell insertion control circuit in its own system.

2. A reception device in an ATM communication apparatus including an active system and a backup system, for switching between the active system and the backup system, each of said active system and said backup system comprising:

a format conversion buffer for effecting a format conversion on a transmission path from a format in which an ATM cell is inserted in only the payload of an SDH frame to a format in which an ATM cell is inserted in both the overhead and payload of an SDH frame, thereby to absorb the difference between transmission path lengths of said active system and said backup system;

an underflow detecting circuit for detecting an underflow of said format conversion buffer and outputting a detected underflow signal;

a transmission path empty cell determining circuit for determining whether there is a transmission path empty cell or not on a write side of said format conversion buffer, and discarding cells without writing the cells when a transmission path empty cell is detected;

an OAM cell determining circuit for determining whether there is an OAM cell or not on a read side of said format conversion buffer, and outputting a detected OAM cell signal when an OAM cell is detected;

an in-device empty cell insertion control circuit for outputting an in-device empty cell insertion instruction signal in response to a detected underflow signal from said underflow detecting circuit in its own system which is one of said active system and said backup system, a detected underflow signal from said underflow detecting circuit in the other system, or a detected OAM cell signal from said OAM cell determining circuit in the other system; and an in-device empty cell insertion circuit for inserting an in-device empty cell into an output signal from said format conversion buffer based on an in-device empty cell insertion instruction signal from said in-device empty cell insertion control circuit in its own system.

* * * * *